United States Patent
Acharya et al.

(10) Patent No.: US 10,111,033 B2
(45) Date of Patent: Oct. 23, 2018

(54) GIS BASED COMPRESSION AND RECONSTRUCTION OF GPS DATA FOR TRANSMISSION FROM A VEHICULAR EDGE PLATFORM TO THE CLOUD

(71) Applicant: Hitachi Ltd., Tokyo (JP)

(72) Inventors: Joydeep Acharya, Sunnyvale, CA (US); Sudhanshu Gaur, Santa Clara, CA (US)

(73) Assignee: HITACHI LTD., Tokyo (JP)

( * ) Notice: Subject to any disclaimer, the term of this patent is extended or adjusted under 35 U.S.C. 154(b) by 13 days.

(21) Appl. No.: 15/086,671

(22) Filed: Mar. 31, 2016

(65) Prior Publication Data

US 2017/0289759 A1    Oct. 5, 2017

(51) Int. Cl.
*H04W 4/02* (2018.01)
*H04B 1/3822* (2015.01)
*H04L 29/06* (2006.01)
*H04L 29/08* (2006.01)

(52) U.S. Cl.
CPC .......... *H04W 4/023* (2013.01); *H04B 1/3822* (2013.01); *H04L 67/18* (2013.01); *H04L 69/04* (2013.01); *H04W 4/02* (2013.01)

(58) Field of Classification Search
CPC ..... H04W 4/023; H04W 4/025; H04W 4/046; H04W 4/02; H04B 1/3822; H04L 67/18; H04L 69/04
See application file for complete search history.

(56) References Cited

U.S. PATENT DOCUMENTS

| | | | |
|---|---|---|---|
| 6,321,158 B1 * | 11/2001 | DeLorme | G01C 21/26 340/995.16 |
| 8,624,758 B2 | 1/2014 | Ingram et al. | |
| 2001/0038642 A1 * | 11/2001 | Alvarez, II | H03M 7/30 370/477 |
| 2003/0060971 A1 * | 3/2003 | Millington | G01C 21/20 701/454 |

(Continued)

FOREIGN PATENT DOCUMENTS

| | | |
|---|---|---|
| WO | 2007013888 A1 | 2/2007 |
| WO | 2008005795 A1 | 1/2008 |

OTHER PUBLICATIONS

CISCO, Fog Computing and the Internet of Things: Extend the Cloud to Where the Things Are (white paper), 2015, retrieved Mar. 30, 2016, 6 pgs.

(Continued)

*Primary Examiner* — Dinh Nguyen
(74) *Attorney, Agent, or Firm* — Procopio, Cory, Hargreaves & Savitch LLP

(57) ABSTRACT

Example implementations described herein are directed to a system involving a cloud architecture and an edge architecture associated with one or more vehicles. The edge architecture can involve devices associated with the one or more vehicles and can conduct edge processing to determine, from Global Positioning Satellite (GPS) information, a proximity of the first apparatus to a first Geographic Information System (GIS) waypoint relative to a second GIS waypoint, generate index information representative of the proximity of the apparatus to the first GIS waypoint relative to the second GIS waypoint; and transmit the index information to the cloud architecture.

13 Claims, 10 Drawing Sheets

(56) References Cited

U.S. PATENT DOCUMENTS

| | | | |
|---|---|---|---|
| 2006/0244587 A1 | 11/2006 | Humphries et al. | |
| 2008/0004038 A1* | 1/2008 | Dunko | H04W 4/08 455/456.1 |
| 2008/0161020 A1* | 7/2008 | Malon | G01S 5/0072 455/456.6 |
| 2008/0162032 A1* | 7/2008 | Wuersch | G08G 1/005 701/533 |
| 2009/0143079 A1* | 6/2009 | Klassen | G01C 21/20 455/456.3 |
| 2010/0257252 A1* | 10/2010 | Dougherty | G06T 19/006 709/217 |
| 2011/0087429 A1* | 4/2011 | Trum | G01C 21/32 701/533 |
| 2012/0185206 A1* | 7/2012 | Zehler | G09B 29/007 702/150 |
| 2012/0239291 A1* | 9/2012 | Do | G01S 5/0236 701/451 |
| 2012/0253488 A1* | 10/2012 | Shaw | G06Q 10/04 700/91 |
| 2014/0015713 A1 | 1/2014 | Liu | |
| 2015/0293232 A1 | 10/2015 | Crawford et al. | |

OTHER PUBLICATIONS

Extended European Search Report dated May 29, 2017, issued by the European Patent Office in counterpart European Patent Application No. 17162325.9, 11 pages.

\* cited by examiner

Road S, Raw GPS

×—×—×—×—×—×—×—×—×—×—×—×—×—×—×—×— FIG. 16A

GPS Points Used in
map for Slow Speed

⊗—⊗—⊗—⊗—⊗—⊗—⊗—⊗—⊗—⊗—⊗—⊗—⊗—⊗— FIG. 16B

GPS Points Used in
map for Fast Speed

⊗—×—×—×—⊗—×—×—×—×—⊗—×—×—×—⊗—×—×—×— FIG. 16C

GIS BASED COMPRESSION AND RECONSTRUCTION OF GPS DATA FOR TRANSMISSION FROM A VEHICULAR EDGE PLATFORM TO THE CLOUD

BACKGROUND

Field

The present disclosure is generally directed to networked apparatuses, and more specifically, to data transmission schemes for networked apparatuses associated with vehicles.

Related Art

With the advent of the Internet of Things (IoT), related art models of data transmission have also been adjusted accordingly. In particular, related art IoT devices generate data that may involve a significantly larger volume, velocity and variety than traditional applications. If the data is transmitted to the cloud for centralized processing, the latency and error performances of the underlying application may suffer, as illustrated in FIG. 1. In an example, dropped packets due to network congestion may delay the data from being processed by the cloud, and also may not reflect the actual situation of the IoT device.

Related art solutions involve IoT edge solutions that can perform localized decision making and processing on the generated data to reduce the volume, velocity and variety of the data before transmission of the processed data to the cloud. The concept of edge processing has thus been implemented in the related art, as illustrated in FIG. 2 to facilitate distributed data processing and data compression. Through the use of edge processing, some of the data processing can be transferred away from the cloud to the edge.

In the related art, an edge processing algorithm performs compression of the incoming IoT sensor data. The related art solutions involve algorithms for data compression in edge processing. FIG. 3 illustrates a related art edge processing platform functionality 300. The flow for such edge processing involves sensor data ingestion 301, data processing 302 and transmission of processed data to the cloud 303. However as illustrated in FIG. 3, the related art implementations compress the data using classical compression algorithms at 302. In related art solutions, there is the application of delta compression (i.e., transmit only the difference between two successive sensor readings, instead of transmitting the actual values) which work as successive sensor readings are correlated. Examples of such solutions can include a system and method for compressing Global Positioning Satellite (GPS) Data, as disclosed in US Patent Application No. 2015/0293232 A1, hereby incorporated by reference in its entirety for all purposes. In another related art solution, there is a method and apparatus for providing transmission of compressed telemetry data in a tracking system, as disclosed in US Patent Application No. 2006/0244587 A1, herein incorporated by reference in its entirety for all purposes.

In another example related art solution, there is a system for data aggregation and transmission to a cloud server. An example of such a solution can include a communication system including a telemetry device for a vehicle connected to a cloud service as described in U.S. Pat. No. 8,264,758 B2, herein incorporated by reference in its entirety for all purposes.

SUMMARY

Aspects of the present disclosure include a system, which may involve a first apparatus, that includes a first processor configured to determine, from Global Positioning Satellite (GPS) information, a proximity of the first apparatus to a first Geographic Information System (GIS) waypoint compared to a second GIS waypoint; generate index information representative of the proximity of the apparatus to the first GIS waypoint compared to the second GIS waypoint; and transmit the index information to a second apparatus.

Aspects of the present disclosure further include an apparatus, which may involve a processor configured to determine, from GPS information, a proximity of the apparatus to a first GIS waypoint compared to a second GIS waypoint; generate index information representative of the proximity of the apparatus to the first GIS waypoint compared to the second GIS waypoint; and transmit the index information to another apparatus.

Aspects of the present disclosure further include an apparatus which may include a processor configured to, for information received indicative of a location of another apparatus being directed to GPS information, calculate a location of the another apparatus based on the GPS information and GIS information; and for the information received from the another apparatus receipt of the index information, determine a proximity of the another apparatus to a first GIS waypoint compared to a second GIS waypoint from the index information, and estimate GPS coordinates of the another apparatus based on the proximity.

BRIEF DESCRIPTION OF DRAWINGS

FIGS. 16A to 16C illustrate examples of spatial sampling, in accordance with an example implementation.

DETAILED DESCRIPTION

Figure 1:
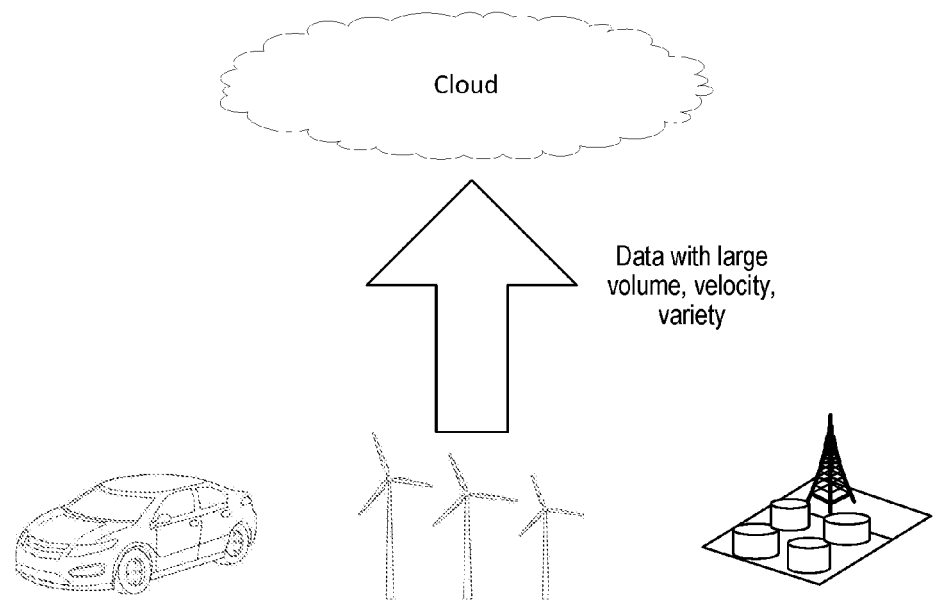
FIG. 1 illustrates a related art model of data transmission.
Figure 2:
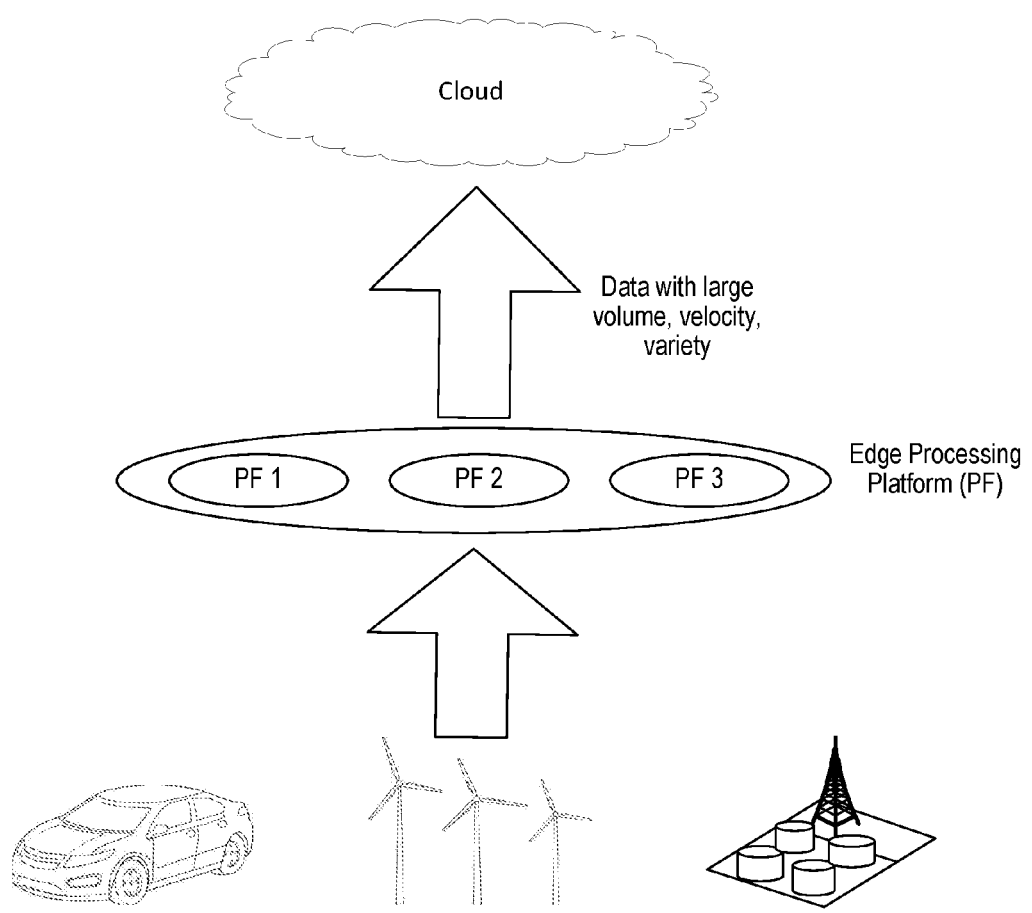
FIG. 2 illustrates a related art model of edge processing.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms "request" and "operation" may also be used interchangeably.

Figure 3:
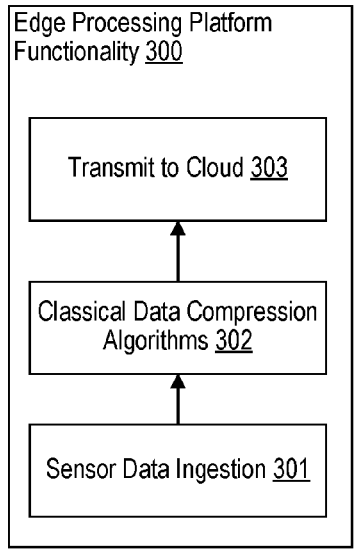
FIG. 3 illustrates a related art edge processing platform functionality.

Example implementations may improve on the related art compression of FIG. 3 through considering the context of the data and through the use of context based compression. A compression technique aims to exploit the correlations in the data set. However, not all data is equivalent (e.g., contrast Global Positioning Satellite (GPS) data from a vehicle to the temperature readings from the same vehicle). A compression algorithm that does not take the underlying application into consideration beforehand and attempts to discover the correlations in the process of compression may not perform better than an algorithm where the context of the data (i.e. the underlying application and correlation structure in the data) is made available beforehand to the compression algorithm.

Figure 4:
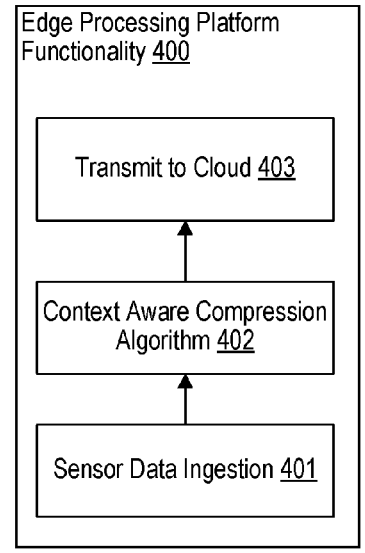
FIG. 4 illustrates edge processing, in accordance with an example implementation.

FIG. 4 illustrates edge processing 400, in accordance with an example implementation. FIG. 4 utilizes a similar implementation as FIG. 3 for data ingestion from sensors 401 and data transmission to the cloud 403. However in FIG. 4, context information is applied for compression of location information (e.g., GPS coordinates) that a vehicle has to transmit for purpose of location tracking as shown at 402. There are many applications wherein location tracking can be utilized. Such applications include fleet management systems, wherein the fleet owner desires to track his fleet and their movement, and ridesharing applications enabled by the driver vehicle broadcasting its initial location to a set of clients and also its subsequent motion once it has been selected.

Example implementations involve methods to significantly compress the overhead of transmitting GPS data to the cloud. The raw GPS information is contained in at least 64 bits (32 bits each for latitude and longitude). If such GPS information has to be transmitted frequently and for a large number of vehicles, then the total load can be significant enough to require compression techniques.

Figure 5:
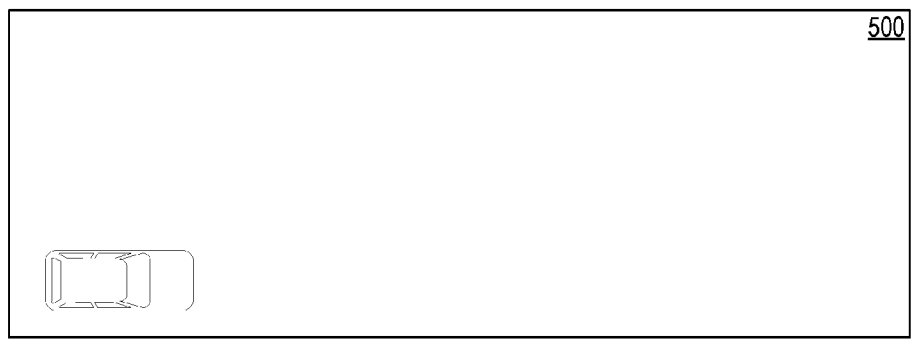
FIG. 5 illustrates an example application without GIS information.

For GPS data, the context information can include the Geographical Information System (GIS) information, i.e. the information of the roads where the vehicle could be located. FIG. 5 illustrates an example application without GIS information. In FIG. 5, there is a vehicle in an urban region depicted by the rectangular region 500. Without GIS information of the region, the set of possible GPS coordinates which correspond to the potential locations of the vehicle may need to involve the whole of the rectangular region, which can be an overly large set as there is no context information to narrow down the potential locations.

However, considering the set of all GPS coordinates in the region can result in a waste of resources. The set should only cover the roads that are located in the rectangular region as a vehicle cannot be located in any general GPS coordinate, outside of parking garages and other temporary non-road places.

Figure 6:
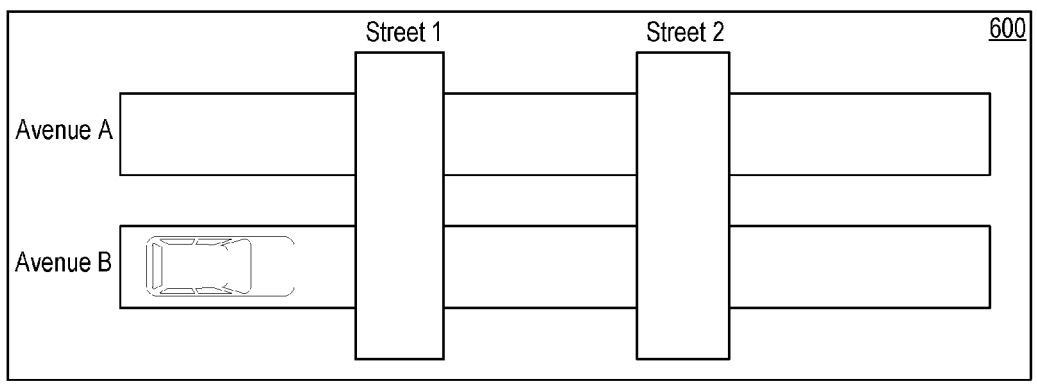
FIG. 6 illustrates an example application of GIS context, in accordance with an example implementation.

FIG. 6 illustrates an example application of GIS context, in accordance with an example implementation. Such information is provided by the GIS context of the GPS data and is illustrated in FIG. 6. As shown in the example given in FIG. 6, only the set of GPS coordinates of {Avenue A, Avenue B, Street 1, Street 2} need to be considered after GIS context information is provided into the rectangular region 600.

Figure 7:
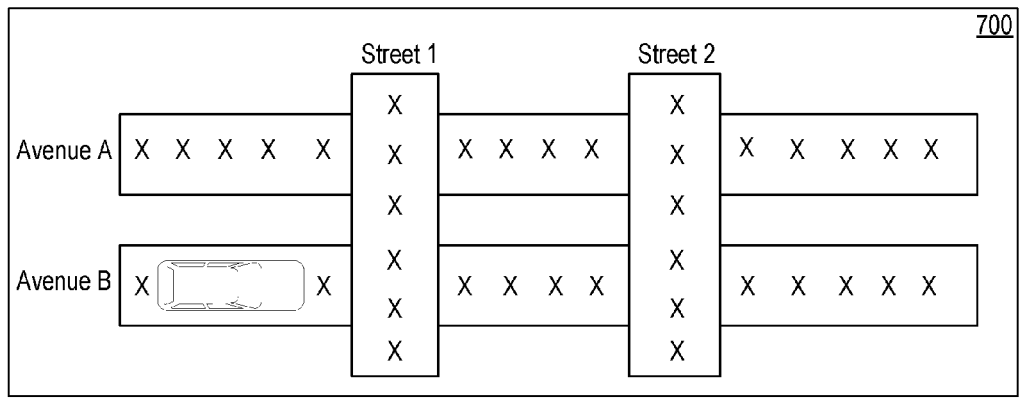
FIG. 7 illustrates an example application of GIS context information and quantization, in accordance with an example implementation.

FIG. 7 illustrates an example application of GIS context information and quantization, in accordance with an example implementation. In example implementations, further compression is possible by limiting the set of possible GPS coordinates. Depending on the application, a very fine graining location tracking may not be needed. Thus, example implementations described herein need only consider a set of sampled GPS data as illustrated in FIG. 7 where the set of possible GPS coordinates are depicted by the crosses within rectangular region 700.

Figure 8:
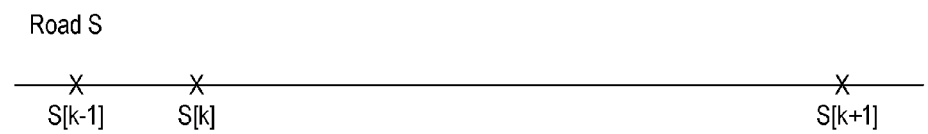
FIG. 8 illustrates an example of road indexing, in accordance with an example implementation.

FIG. 8 illustrates an example of road indexing, in accordance with an example implementation. In the following examples, the GPS information set using GIS database may include information for roads and intersections. Through use of the GIS information, the edge processing platform and the cloud can have a common database of roads. The database can maintain an index of all roads and also index of all points along a road. Consider the case of a straight road as illustrated in FIG. 8. The road index is shown as 'S' and the indices of the point by 'k'. Thus possible points are S[k], S[k+1] etc. An example table for GIS index points that associate GIS waypoints for each road to raw GPS coordinates is provided as shown below in Table 1. The edge processor of the vehicle, as well as the cloud processor, are configured to have access to the information of Table 1, to compare GPS locations to GIS waypoints, and to determine the road index and GIS waypoint index information of an edge processor. Each of the GIS waypoints of the road index is mapped to an index. That is, the set of GIS waypoints is represented as a vector for the road index and is represented as S[k], where k corresponds to a GIS waypoint in the road index.

TABLE 1

| Road Index | GPS location of GIS waypoints | Intersection Points |
| --- | --- | --- |
| S | (44.112, −87.113), (44.112, −87.115), (44.112, −87.117) . . . | (44.115, −87.117), . . . |
| T | (44.115, −87.114), (44.115, −87.117) . . . | (44.115, −87.117) |
| U | (44.118, −88.116) (44.116, −88.115) . . . | (44.113, −88.114) |

GIS INDEX POINTS FOR LOCATION MAPPING

Figure 9:
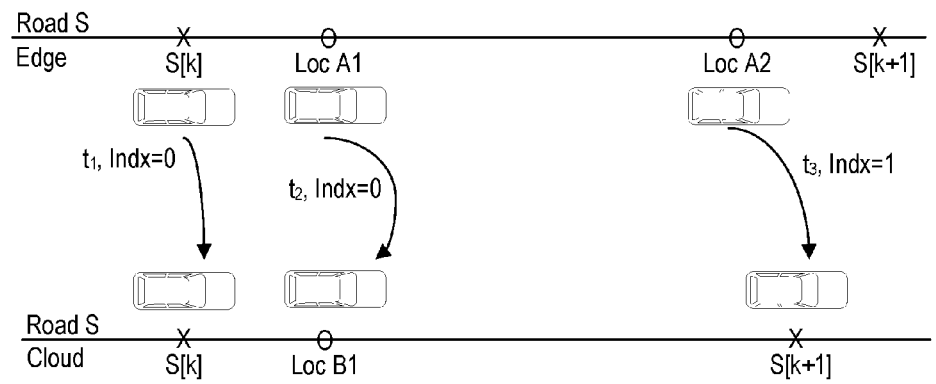
FIG. 9 illustrates a road processing in accordance with an example implementation.

FIG. 9 illustrates a road processing in accordance with an example implementation. The top portion of FIG. 9 shows the actual situation at the vehicle edge, the middle portion shows what is transmitted to the cloud and the bottom portion shows the vehicle location as reconstructed at the cloud based on the information transmitted by the edge.

The sequence of events can be understood as follows:

At time t1, the vehicle is located at GPS location S[k] and assume that the GPS location is known both at the edge and the cloud, and that it is further known by both the edge and the cloud that the vehicle is moving towards the direction of point S[k+1]. At the start of the example implementations, the car transmits the raw GPS point until the cloud tracks the location and direction initially, after which the context aware compression can be initiated. In an example implementation, S[k] and S[k+1] can be determined initially by comparing the raw GPS point to the index table as illustrated in Table 1 to determine the closest index point to the raw GPS point. From the comparison of the raw GPS point to the corresponding index point in Table 1, S [k] and the subsequent point on the index table S[k+1] can be initialized.

The vehicle transmits an index field. In this example implementation, the index field is one bit, however, the index field can be implemented by other methods according to the desired implementation. The value of Index=0 could mean that the vehicle is closer to point S[k] than S[k+1] while the value of Index=1 could mean that the vehicle is closer to point S[K+1].

At time t1, the edge processor at the vehicle transmits Index=0 based on the rules above. The cloud reconstructs the position of the vehicle at point S[k].

At time t2, the edge processor at the vehicle determines its present location from the GPS information. Let the present location for this example be called A1, wherein A1 is closer to S[k] than S[k+1]. The edge processor can determine its proximity to S[k] versus S[k+1] by processing the present raw GPS coordinates of the vehicle, and comparing the location to the index table as illustrated in Table 1. Upon determining that the raw GPS coordinates of its location at A1 is closer to S[k] than S[k+1], the edge processor transmits Index=0. The cloud receives Index=0 and notes that this value is identical to the last received value. The cloud therefore determines that the car was already close to S[k] at the time of the last report and has moved ahead in the intervening time, but is not yet close enough to S[k+1] to have elicited the Index=1 report. The cloud can use the determination to design an estimation algorithm to predict the location of the vehicle. In the example shown, the cloud estimates the location to be at B1. There is a location estimation error |A1-B1|. The margin of tolerable error is given by the application and can be traded off with how closely spaced the GPS samples in a road are considered.

At time t3, the edge processor determines that it is located at point A2 which is closer to point S[k+1] and thus transmits Index=1. The cloud estimates the location of the car at point S[k+1]. Thus, the cloud can infer the GPS without the edge needing to transmit the raw GPS coordinates, thereby achieving compression.

Figure 10:
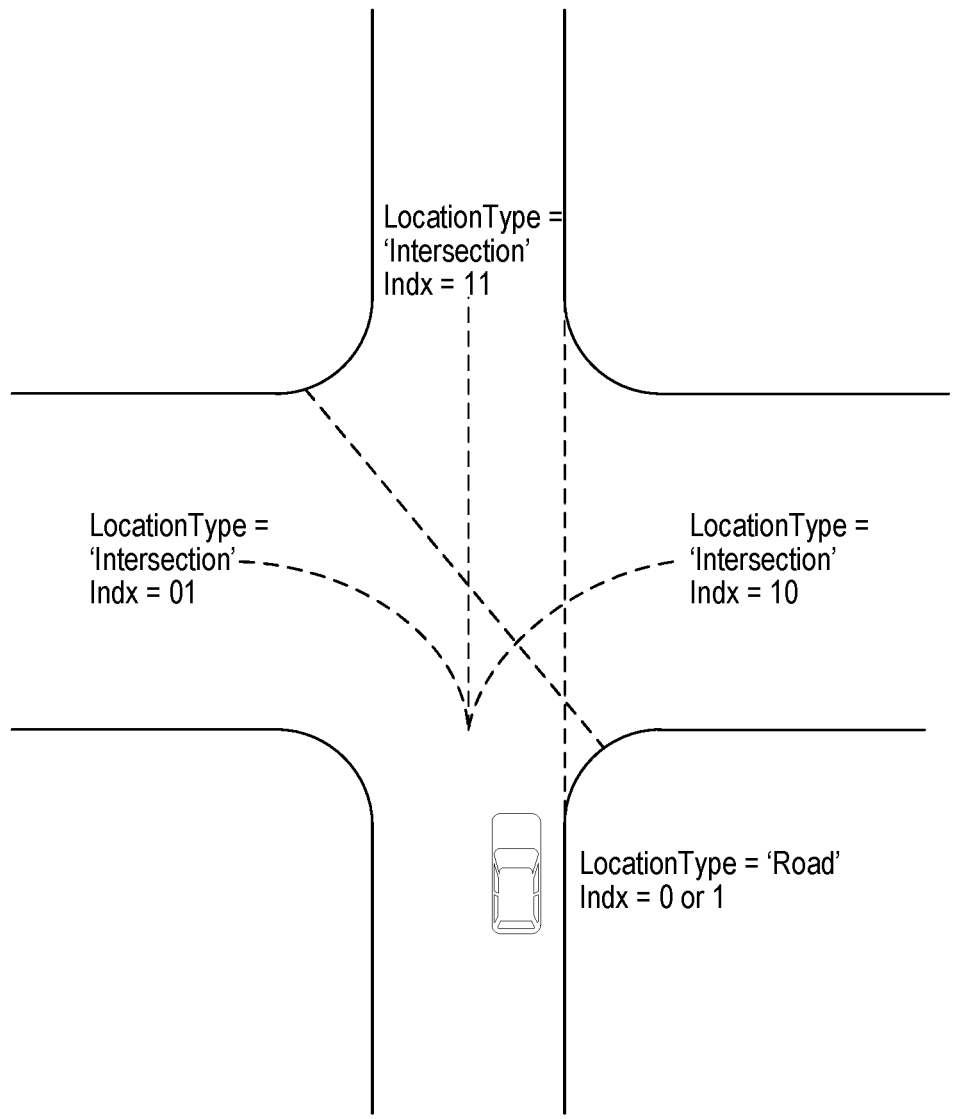
FIG. 10 illustrates an intersection scenario, in accordance with an example implementation.

In example implementations, the edge processor can determine that the vehicle is located at an intersection or is making a turn at an intersection from one road to another. FIG. 10 illustrates an intersection scenario, in accordance with an example implementation. In FIG. 10, the vehicle is at an intersection. In the example, the vehicle has three possible options—continuing straight, turning left and turning right. A scheme can be defined such that all the roads are enumerated. As shown in FIG. 10, the three roads are enumerated as '11', '01' and '10' respectively. Note again that assuming that the initial location of the vehicle is known at the edge and the cloud and since the GIS information is common at both ends; both entities can be informed of the possible roads at the intersection and their enumerations if the enumeration algorithm is agreed upon initially. Thus, the common availability of the GIS information at both ends obviates the necessity of one side enumerating the roads and sharing this with the other side for all possible intersections. Rather the enumeration algorithm will need to be shared one time initially. To perform such similar, one-time initializations example implementations utilize a management plane at both the edge and cloud.

Now if the edge processor determines that the vehicle is in the process of making a left turn for e.g., it only has to transmit the Index of this event (01 in this example). To distinguish between the different types of possibilities for reporting the index from the case of the vehicle being in a straight road (e.g., 1 bit for possibility of 0 or 1) to an intersection (more bits depending on the number of intersecting roads), an additional 1 bit field called LocationType can also be transmitted to convey of the vehicle is in a straight road (e.g. LocationType=0 or 'Road' which is the logical value) or an intersection (e.g. LocationType=1 or 'Intersection' which is the logical value).

Figure 11:
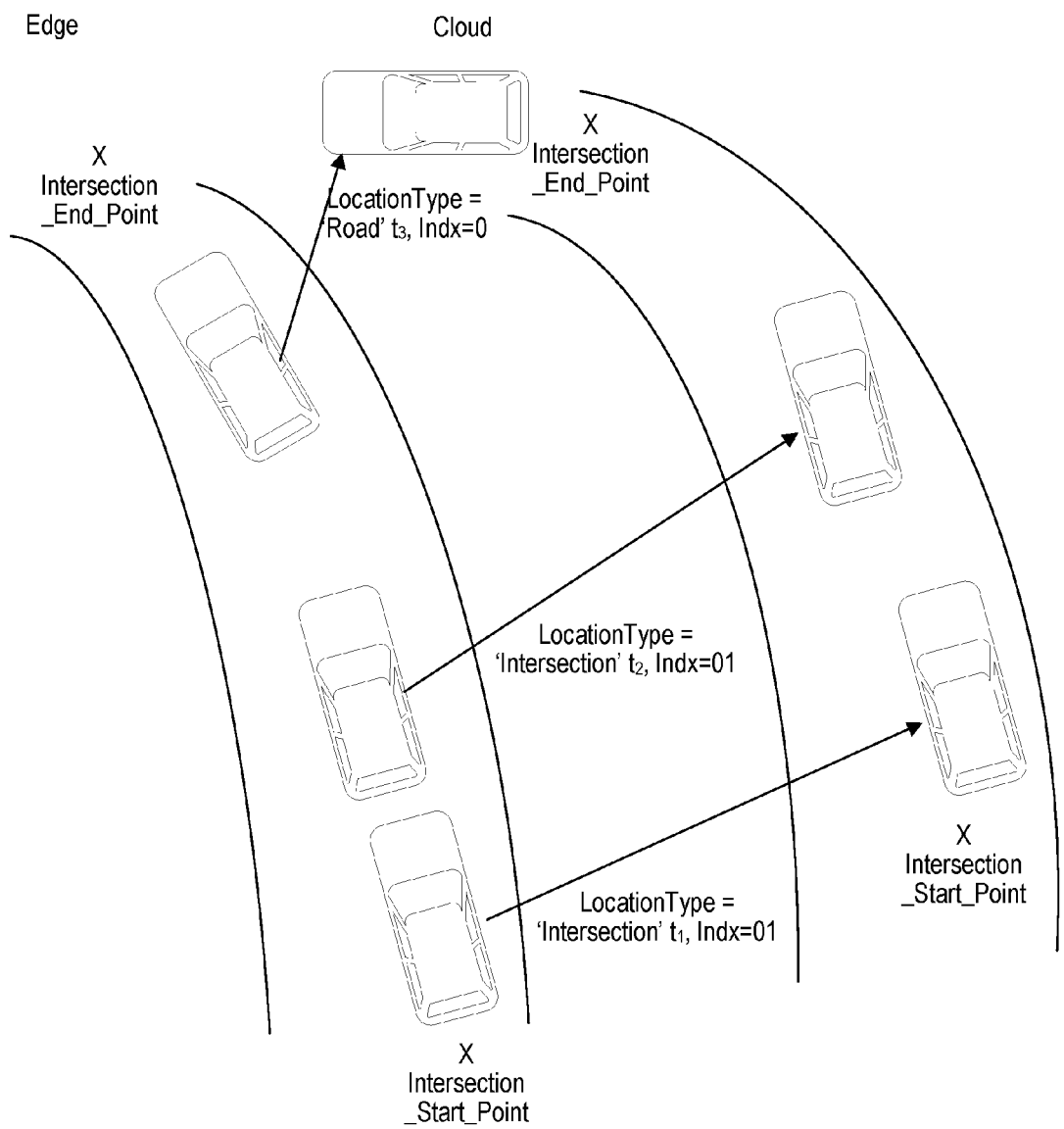
FIG. 11 illustrates intersection processing, in accordance with an example implementation.

FIG. 11 illustrates intersection processing, in accordance with an example implementation. Each intersection can be defined by a start and end point labeled Intersection_Start_Point and Intersection_End_Point respectively. When approaching the Intersection_Start_Point, the edge processor recognizes that the next GIS index point is an intersection based on the information from Table 1. When the edge processor finally passes the Intersection_Start_Point based on comparing its present GPS location with the GPS location of the GIS waypoint of the intersection, the edge processor in the vehicle will transmit LocationType=1 (or logical value 'Intersection' as shown in FIG. 11) and the Index (01 in this case). The edge processor determines the Intersection_End_Point based on identifying the possible subsequent GIS waypoints from the Intersection_Start_Point of Table 1. As soon as the edge processor deems that the car has crossed over the intersection and is in the road at the Intersection_End_Point (e.g., based on comparing the raw GPS location with the GIS waypoint at Table 1 to determine the next index point of the edge processor), the edge processor will transmit LocationType=0 (or logical value 'Road') and the value of Index (which will initially be 0 as the car just enters the road). The cloud then reconstructs the location of the vehicle based on the number of Index='01' messages received in a similar way to the straight road case discussed in FIG. 9.

Figure 12:
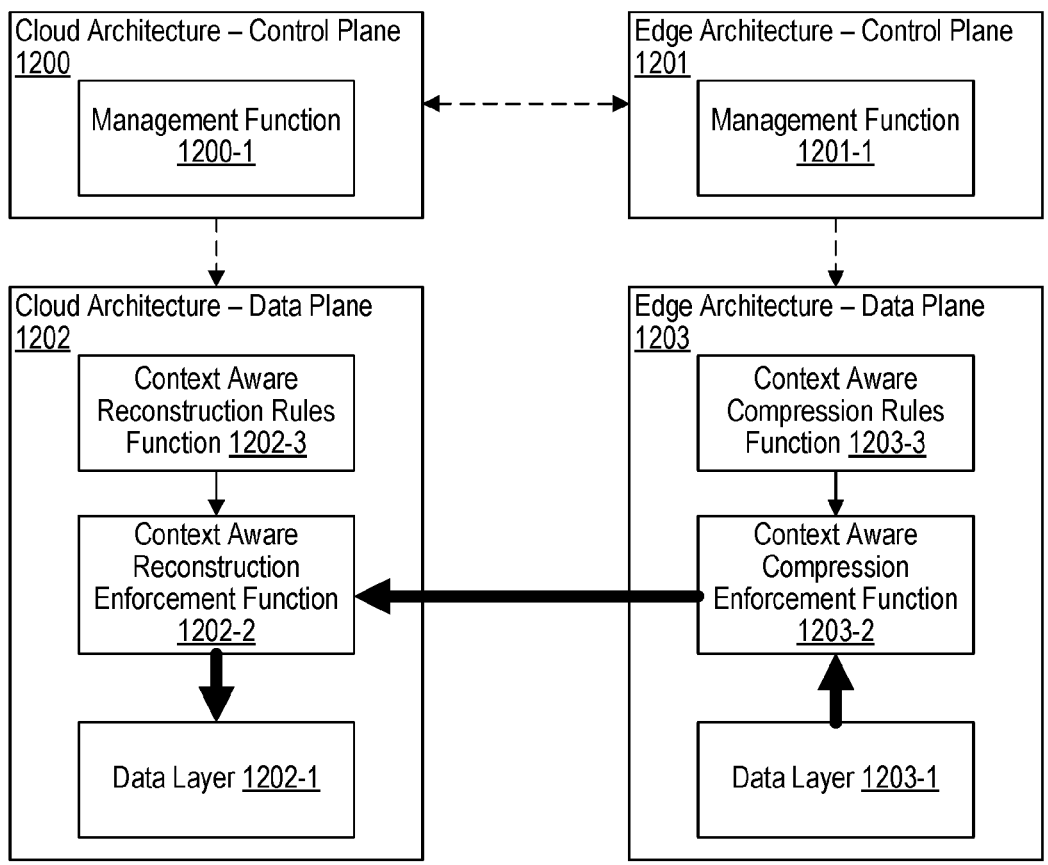
FIG. 12 illustrates an example architecture upon which example implementations may be applied.

FIG. 12 illustrates an example architecture upon which example implementations may be applied. Both the cloud and edge architectures are shown along with how they interconnect. The architecture involves a data plane and a control plane.

Data Planes 1202, 1203 are configured to manage actual sensor data and form rules to compress the and provide enforcement of such rules. Control planes 1201, 1202 are configured to handle the initial exchange of control information between the cloud and the edge so that the subsequent compression works. Note that this is limited and mostly either one time at the beginning of the session or with additional infrequent updates. Thus, the overhead of the control plane messaging is minimal.

The various functionalities of the edge are as follows. Data Layer 1203-1 manages sensors and generates data. Compression Aware Compression Enforcement Function 1203-2 performs all the compression algorithms and then transmits the compressed data to the corresponding module at the cloud for the Context Aware Reconstruction Enforcement Function 1202-2. Compression Aware Compression Rules Function 1203-3 is configured to determine the rules of how compression should be done (as opposed to the Enforcement function which enforces these rules). Management function 1201-1 is configured to interact with the corresponding management function 1200-1 at the cloud to perform the control plane functionalities.

The various functionalities at the cloud are as follows. Data Layer 1202-1 takes in the reconstructed location information and passes this to the subsequent application. Compression Aware Reconstruction Enforcement Function 1202-2 performs all the reconstruction algorithms over the compressed location data that it has received from the corresponding module at the edge (the Context Aware Compression Enforcement Function 1203-2). The Context Aware Reconstruction Rules Function 1202-3 decides all the rules of how reconstruction should be done. The management function 1200-1 which interacts with the corresponding function at the edge to perform the control plane functionalities.

Note that the data plane compression and reconstruction rules functions at the edge and cloud facilitate the functionality of the example implementations, with the other functionalities constructed to support the data plane compression and reconstruction. As seen in FIG. 12, the data plane and reconstruction functions do not have to directly communicate with each other to facilitate the example implementations. All control related communication between the edge and the cloud can occur through the management plane which can be implemented to communicate infrequently with a low load, depending on the desired implementation. The separation of the compression and reconstruction rules functions helps to achieve distributed behavior between the cloud and edge which is needed to enable edge processing for IoT.

Figure 13:
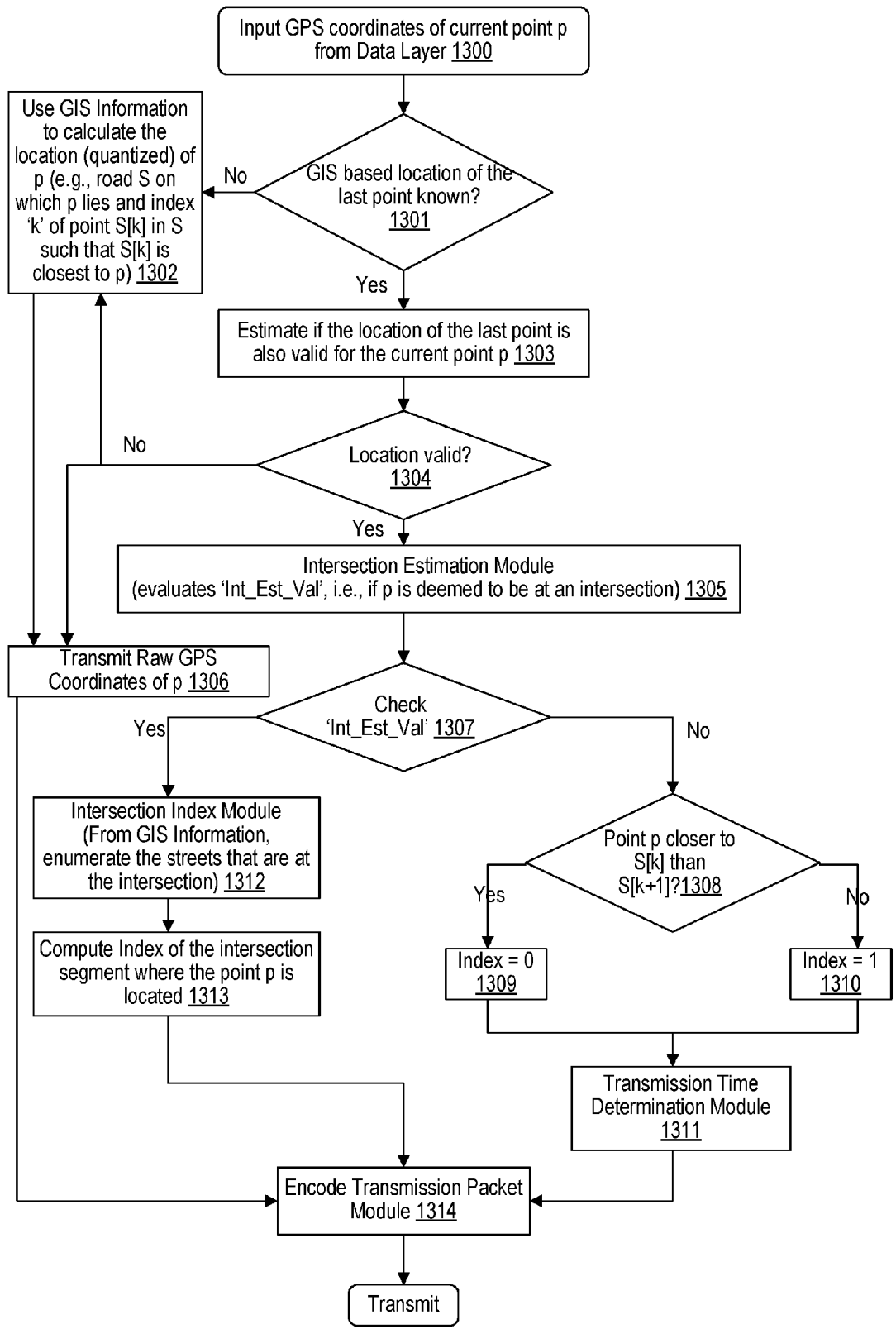
FIG. 13 illustrates a context aware compression rules flow diagram, in accordance with an example implementation.

FIG. 13 illustrates a context aware compression rules flow diagram, in accordance with an example implementation. Specifically, FIG. 13 illustrates an example flow for the context aware compression rules function 1203-3. The raw GPS data of a point is fed as input from the data layer at 1300. At 1301, a check is performed to determine if the GIS location of the last point is known. That is, a check is made as to whether there is a previous index point used as a reference. For example, if previous GIS waypoint indexes were not determined by the edge processor and sent to the cloud processor, or if the edge processor was activated for the first time, then the last point will not be known, and the last GIS location index will be NULL. If the previous GIS waypoint index was calculated and sent to the cloud processor, then the previous GIS waypoint index will be in the form of a road index (e.g. S[k]). As illustrated in FIG. 10, that this location can be represented by the parameter 'LocationType' which takes in logical values 'Road' and 'Intersection' and the actual values of these parameters (i.e. name of road or the roads that make up an intersection) and the point in the location (road or intersection) which is the closest to the input point. If this information is not known (No) (e.g., due to being first point being input by the data layer session), then the flow proceeds to 1302 to use the GIS information database to calculate the information to be used for future points. That is, the raw GPS data at point p(current)is compared to the raw GPS data of the GIS information database from Table 1 to determine the road index (S in the example of FIG. 13) and the corresponding GIS waypoint k in the GIS information. After the road index and GIS waypoint is determined, the subsequent GIS waypoints along the road index S can be utilized for determining the potential future GIS index points. The flow proceeds to 1306 to transmit the raw GPS coordinates of this point to the reconstruction function of the cloud.

If the GIS information of the last data is known (yes), then there is a possibility that the same data may be used to compress the GPS of the current data (i.e. transmit the Index values instead of raw GPS coordinates). However this may not be possible, as the GIS information of the last point may no longer be valid, which can occur for intersections that are not well tracked. The flow proceeds to 1303 to estimate if the GIS information of the last data point still is valid based on the estimate for the current point and to 1304 to determine if the last data point is valid.

For example consider the situation illustrated in FIG. 8. For the last point p(last), the edge knows the distances |p(last)−S[k]| and |S[k+1]−p(last)| and from this the edge can infer the expected behavior of |p(current)−S[k]| and |S[k+1]−p|, namely |p(last)−S[k]|≤|p(current)−S[k]| and |S[k+1]−p(last)|≥|S[k+1]−p|. If there is significant deviation from this distance, then there is a chance that the GIS location information of the last point is no longer valid. There could be multiple reasons such as the vehicle left the road, took an intersection that was not tracked, or its speed increased or decreased significantly since the time the last point was transmitted.

If it is deemed that the GIS location information is no longer valid (No), then the flow proceeds to 1302 and 1306 to use the GIS database to obtain new GIS location information and transmit the raw GPS coordinates.

If the location of the last point seems valid (Yes), then the flow proceeds to 1305 to first check the LocationType of the current point—i.e. whether it is still on a road or is at an intersection. This leads to setting the value 'Int_Est_Val' i.e. if the vehicle is deemed to be at an intersection ('YES') or not ('NO').

One difference between LocationType and Int_Est_Val parameters is that the former parameter tries to denote is the vehicle is actually at an intersection while the latter is more of a mode of the subsequent algorithm about whether the alrogithm should assume that a vehicle is at an intersection or not. LocationType may indicate that the vehicle is at an intersection, however such an estimation may not be accurate, and the subsequent algorithm may choose to ignore this information by setting Int_Est_Val=NO. In such cases what would happen is that when a GPS point comes with the vehicle at the intersection, the location may not match with the last point (usually one in a straight road) and thus raw GPS point will be transmitted. Thus, in an example implementation, raw GPS information is transmitted whenever the vehicle is at an intersection and the data is compressed whenever the vehicle is moving along a straight road.

At 1307, the Int_Est_Val is checked. If Int_Est_Val=NO, then estimate if p(current)is closer to S[k] or S[K+1] at 1308 and set the value of Index=0 or 1 accordingly at 1309 and 1310. This result is then processed at 1311 by the transmission time determination module, which determines when this compressed GPS information should be transmitted. The details of this module depend on the Transmission Mode of the system, which is described in more detail at FIG. 15. If the mode is 'Regular Spatial Sampling' then transmit whenever Index=1. If the mode if 'Regular Temporal Sampling', the GPS coordinates are transmit regularly at time interval Ts, whose value is set in the Management Function in FIG. 15.

If Int_Est_Val=YES, then the flow proceeds to 1312 determine the direction to which the car is headed in an intersection, the start and end GPS points of the intersection and transmit this to the cloud. At 1313, the index of the intersection segment is computed where the point p(current) is located.

At 1314, the packet encoder module takes the information generated by the preceding algorithm such as a raw or compressed GPS, LocationType information and forms the variable size packet for transmission. Further details are provided below with respect to Table 1.

Figure 14:
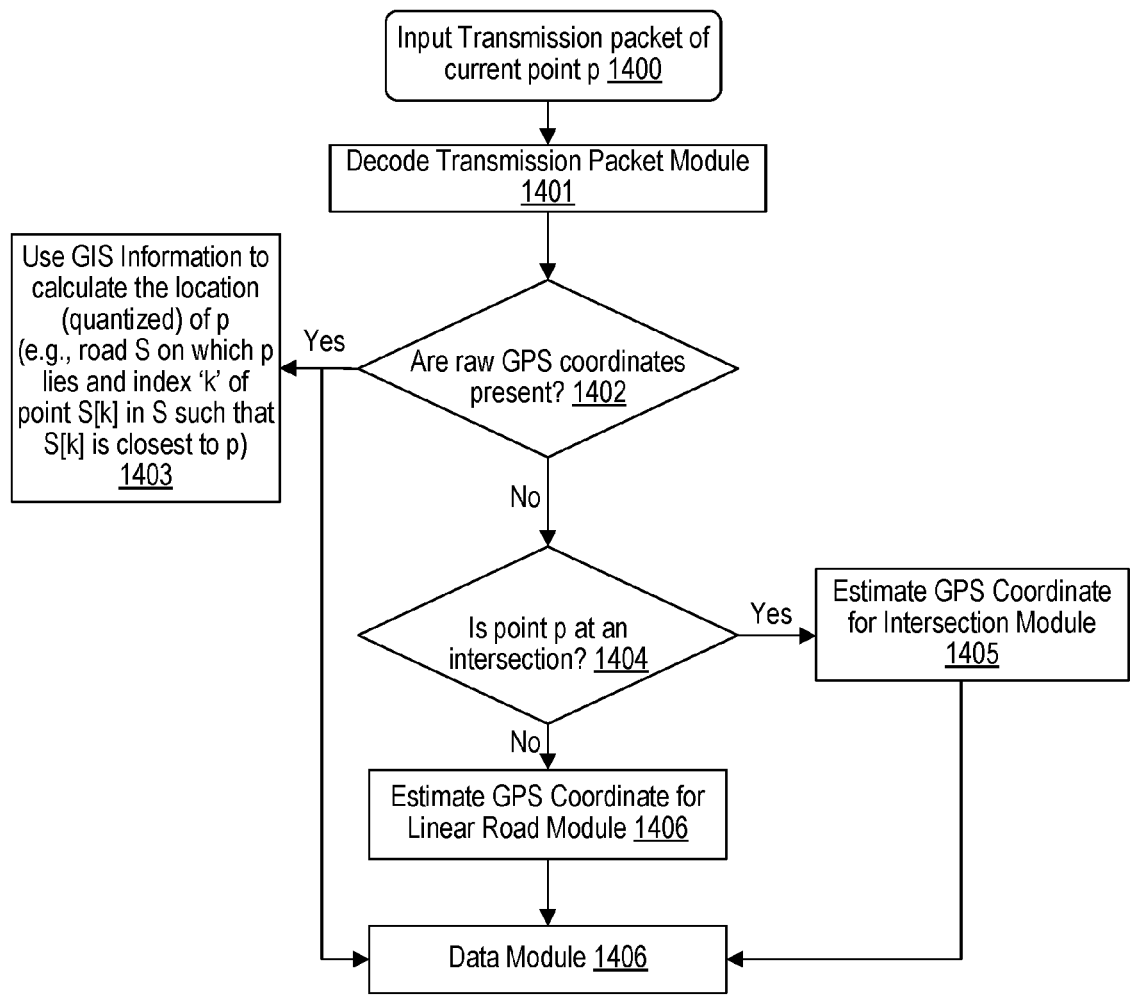
FIG. 14 illustrates a flow diagram for the context aware reconstruction rules functionality, in accordance with an example implementation.

FIG. 14 illustrates a flow diagram for the context aware reconstruction rules functionality 1202-3, in accordance with an example implementation. At 1400, the context aware reconstruction rules functionality receives a packet from the edge enforcement layer. At 1401, the context aware reconstruction rules functionality decodes the transmission packet. At 1402, a check is conducted to determine if raw GPS coordinates are present.

If raw GPS coordinates are present (Yes), then the flow proceeds to 1403 to pass the raw GPS coordinates to the data layer. Further, at 1403, the GIS information database is used to compute the location information of the point (LocationType, the point in the road which is closest etc.) in a manner that is similar for the edge case as described in FIG. 13. If not (No), then the flow proceeds to 1404 as the transmission packet involves compressed coordinates. At 1404, the LocationType is determined (i.e. if the point is at an intersection or in a straight road).

If the point is determined to be in a road (No), then the flow proceeds to 1406 to estimate the GPS coordinate assuming a linear road as disclosed in FIG. 9. GPS coordinates can be estimated by any desired implementation given the sequence of Index values. For example, one specific way could be as follows: If Index=1, estimate GPS location to be S[k+1], otherwise If Index=0, calculate the number of consecutive Index=0 values and call it P. Note for the algorithm to be in this part of the loop, P≥1. Then define rho=1/(1+a*(P−1)) where a is a constant that can be chosen from the set {1, 0.5, 0.25, 0.1}. Then, the GPS coordinate is estimated as rho*S[k]+(1−rho)*S[K+1].

If the point is determined to be at an intersection (Yes), then the flow proceeds to 1405 to estimate the GPS coordinate assuming an intersection. Any algorithm can be utilized to determine the GPS coordinate for an intersection in accordance with the implementations as described in FIG. 11.

At 1406, the estimations are processed as data which can then be used in the flow of FIG. 13.

Figure 15:
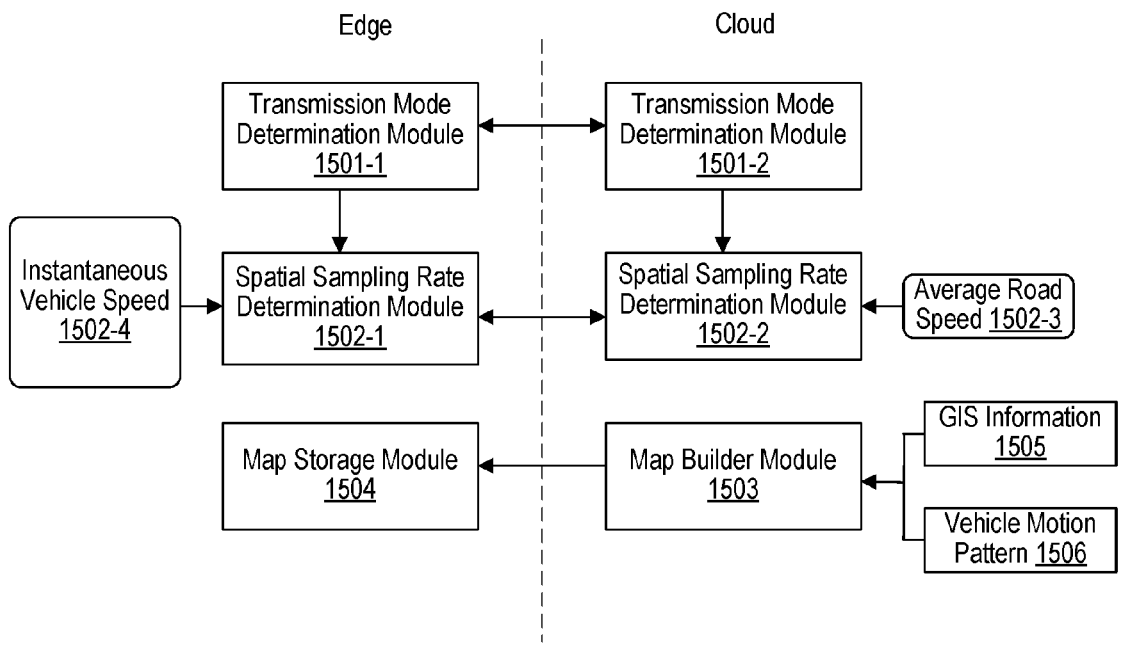
FIG. 15 illustrates an example management flow, in accordance with an example implementation.

FIG. 15 illustrates an example management flow, in accordance with an example implementation. The management layer of FIG. 15 is illustrated for both the edge and the cloud. The management layer can involve the following modules. The Transmission Mode Determination Module 1501-1, 1501-2 determines which one of the two following modes the algorithm should run. The algorithms that can be executed include the Regular Temporal Sampling, which indicates that GPS information is transmitted from the edge at regular intervals of time, and Regular Spatial Sampling, which indicates that GPS information is transmitted from the edge at regular spatial intervals such as when the vehicle reaches the next GPS point in the GIS database. The algorithm selection can be conducted jointly through negotiations between the edge and the cloud and can be determined by the requirements of the underlying application.

The Spatial Sampling Rate Determination module 1502-1, 1502-2 is configured to alter the spacing between the GPS points in the GIS database. The spacing is determined by negotiations through the modules at the edge (which has information of the instantaneous vehicular speeds 1502-4) and the cloud (which has information about the average road speeds 1502-3) and is further described with respect to FIG. 16A to 16C.

The map builder module 1503 at the cloud takes the information of the spatial sampling rate, the GIS information 1505 and also the individual mobility pattern 1506 of a vehicle and determines the GIS database specific to a given vehicle. This information is then shared with the edge at the map storage module 1504. The need for vehicle specific databases may arise from use cases (e.g., fleet management). The route of the vehicles can be decided and tracked within the route.

FIGS. 16A to 16C illustrate examples of spatial sampling, in accordance with an example implementation. Specifically, FIGS. 16A to 16C illustrates an example derivation of the GPS sampling rate, which is used to determine the distance between the first GIS waypoint from the second GIS waypoint. The GPS sampling rate is the rate of spatial sampling of GPS coordinates conducted for comparison with GIS waypoints, as illustrated in Table 1. FIG. 16A illustrates the GPS points (denoted by crosses) at its more fine grained resolution along a road. For a slow moving vehicle or road condition, the GIS database can have all these points as is illustrated in FIG. 16B (shown by circles). However consider the case when the traffic is fast moving. In this case, the set of sampled GPS points may need to be spread apart more, otherwise there could be very frequent updates (in case of regular spatial sampling) or inaccuracies (in case of regular temporal sampling as by the time the next reporting instant comes the vehicle is well past point S[k+1]). Thus, example implementations adjust the spatial sampling rate of the GPS coordinates as per the road speed conditions. As shown in FIG. 16C, a higher sampling rate is chosen if the road speed is higher.

Further, in example implementations there is an Encode Transmission Packet module. The main challenge of the encoder is to incorporate different types of information, having different lengths which happen as the packet may be carrying raw GPS or compressed GPS information. A structure of the packet and its fields is shown in Table 1 below.

TABLE 2

PACKET CODING FORMAT

| Field Name | Bits | Explanation |
|---|---|---|
| IsCompressed | 1 | 1: Compressed, 0: Raw |
| LocationType | 1 | 1: Intersection, 0: Road. Present only for IsCompressed = 1 |
| Data | 1-64 | IsCompressed = 1 & LocationType = 0, then 1 bit, IsCompressed = 1 & LocationType = 1, then 1 + bits depending on the number of intersecting roads IsCompressed = 0, then 64 bits of raw GPS information |

Example implementations can achieve a 50% to 90% reduction in data required to be transmitted from a vehicle in order to convey its location information to a cloud based server. The reduction can increase system capacity and make a location tracking service available to more vehicles than before. Example implementations can be achieved with minimal edge processing at the vehicle corresponding processing at the cloud.

Figure 17:
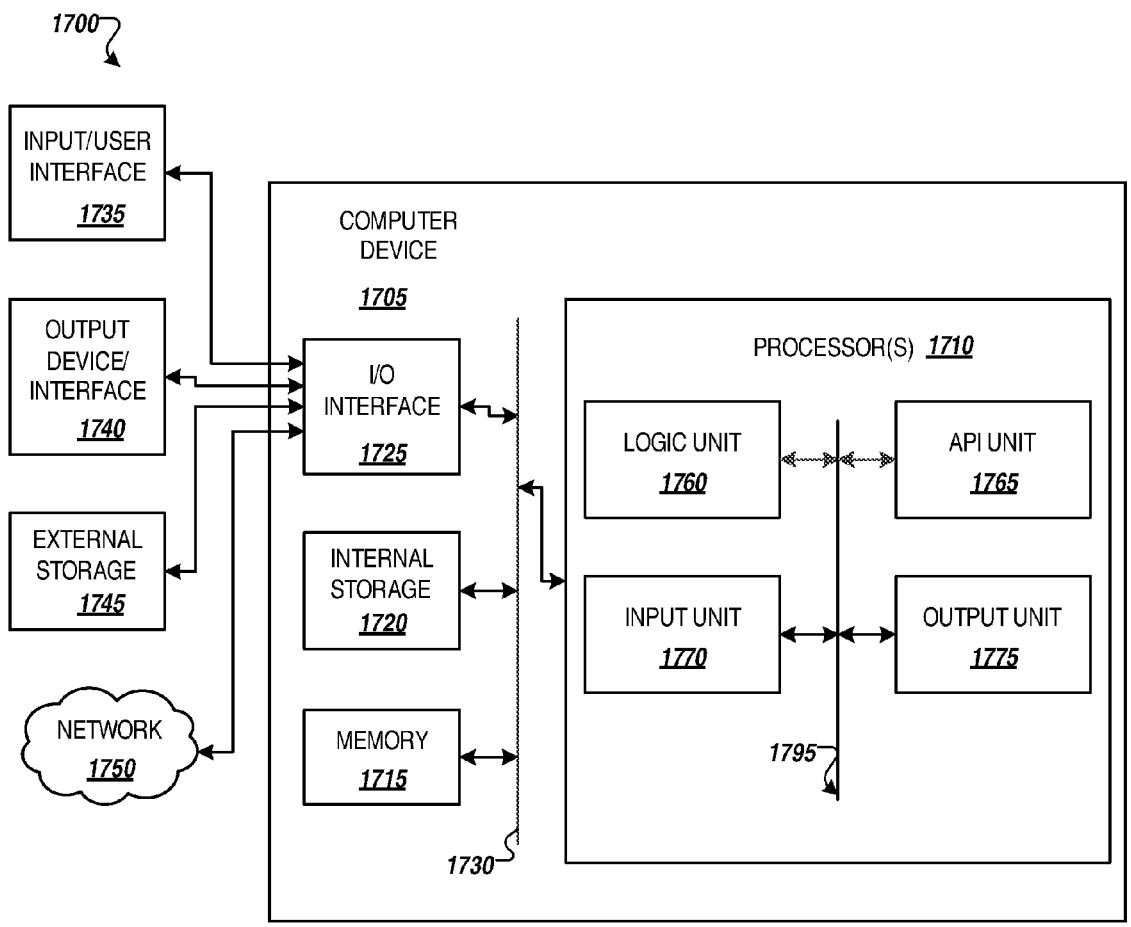
FIG. 17 illustrates a computer environment upon which example implementations may be applied.

FIG. 17 illustrates an example computing environment upon which the example implementations can be implemented. Example implementations for the edge architecture, and the cloud architecture as illustrated in FIGS. 4, 12 and 15 along with the flow diagrams of FIGS. 13 and 14 can be executed on a computer device 1705 configured to be an edge apparatus, or a computer device 1705 configured to be a cloud apparatus respectively. Computer device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computer device 1705.

Computer device 1705 can be communicatively coupled to input/user interface 1735 and output device/interface 1740. Either one or both of input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via I/O interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computer device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment.

One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, input unit 1770, output unit 1775, in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide output based on the calculations described in example implementations.

When the computer device 1705 is configured to facilitate functionality of the edge architecture, the processor(s) 1710 can be configured to determine, from Global Positioning Satellite (GPS) information, a proximity of the computer device 1705 to a first Geographic Information System (GIS) waypoint compared to a second GIS waypoint; generate index information representative of the proximity of the apparatus to the first GIS waypoint compared to the second GIS waypoint; and transmit the index information to the cloud architecture as illustrated in FIGS. 4, 13 and 15. For the proximity of the computer device 1705 to the first GIS waypoint compared to the second GIS waypoint not being determinable, processor(s) 1710 are configured to transmit the GPS information to the cloud architecture as disclosed in FIG. 13. Processor(s) 1710 can also be configured to transmit packets involving compression information indicative of uncompressed data when the processor(s) 1710 transmits the GPS information, and indicative of compressed data when the processor(s) 1710 transmits the index information as illustrated in Table 1. Processor(s) 1710 are configured to obtain the GPS information based on the GPS sampling rate and can adjust the GPS sampling rate accordingly as illustrated in FIGS. 16A to 16C.

When the computer device 1705 is configured to facilitate functionality of the cloud architecture, processor(s) 1710 can be configured to, for receipt of GPS information from the edge apparatus, calculate a location of the edge apparatus based on the GPS information and GIS information and for receipt of the index information, estimate GPS coordinates of the edge apparatus from the index information as described in FIG. 14. The index information can include a first value that is set based on the proximity of the edge apparatus to the first GIS waypoint compared to the second GIS waypoint, and, for the edge apparatus being in proximity to an intersection, a second value indicative of another proximity of the edge apparatus to a pathway of a plurality of pathways of the intersection. Processor(s) 1710 can also be configured to determine a GPS sampling rate for the edge architecture, and transmit the GPS sampling rate to the edge architecture as illustrated in FIGS. 16A to 16C.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system, comprising:
   a first apparatus, comprising:
   a first memory; and
   a first processor coupled to the first memory, the first processor configured to:
   determine, from Global Positioning Satellite (GPS) information, a road index from a plurality of road indexes corresponding to a road of the first apparatus, each of the plurality of road indexes comprising one or more Geographic Information System (GIS) waypoints disposed on the road corresponding to the each of the plurality of road indexes, each of the one or more GIS waypoints represented as indices within the each of the plurality of road indexes;
   determine, from the GPS information, a proximity of the first apparatus to a first GIS waypoint of the one or more GIS waypoints of the road index relative to a second GIS waypoint of the one or more GIS waypoints of the road index;
   generate index information as a compressed representation of the GPS information representative of the proximity of the first apparatus to the first GIS waypoint relative to the second GIS waypoint, the index information comprising the road index corresponding to the road of the fist apparatus and one or more values for the indices of the fist GIS waypoint and the second GIS waypoint within the road index; and
   transmit the index information to a second apparatus.

2. The system of claim 1, further comprising a second apparatus comprising a second memory and a second processor coupled to the second memory, the second processor configured to:
   for receipt of GPS information from the first apparatus, calculate a location of the first apparatus by determining the first GIS waypoint and the second GIS waypoint from the GPS information by a comparison of the GPS information to GPS information of one or more GIS waypoints;
   for receipt of the index information, estimate GPS coordinates of the first apparatus from the index information.

3. The system of claim 1, wherein the index information comprises a first value that is set based on the proximity of the first apparatus to the first GIS waypoint compared to the second GIS waypoint, and, for the first apparatus being in proximity to an intersection, a second value indicative of another proximity of the first apparatus to a pathway of a plurality of pathways of the intersection.

4. The system of claim 1, wherein the first processor is configured to, for the proximity of the first apparatus to the first GIS waypoint compared to the second GIS waypoint not being determinable, transmit the GPS information to the second apparatus;

wherein for the first GIS waypoint not being valid for the GPS information, transmit the GPS information to the second apparatus;

wherein for the first GIS waypoint and the second GIS waypoint not being known, determine the first GIS waypoint and the second GIS waypoint from the GPS information by a comparison of the GPS information to GPS information of one or more GIS waypoints.

5. The system of claim 4, wherein the first processor is further configured to transmit compression information indicative of uncompressed data when the first processor transmits the GPS information, and indicative of compressed data when the first processor transmits the index information.

6. The system of claim 2, wherein the second processor is configured to determine a GPS sampling rate that determines a distance between the first GIS waypoint from the second GIS waypoint for the first apparatus, and transmit the GPS sampling rate to the first apparatus;

wherein the first processor is configured to obtain the GPS information based on the GPS sampling rate.

7. An apparatus, comprising:
a memory, and
a processor coupled to the memory, the processor configured to:
determine, from Global Positioning Satellite (GPS) information, a road index from a plurality of road indexes corresponding to a road of the first apparatus, each of the plurality of road indexes comprising one or more Geographic Information System (GIS) waypoints disposed on the road corresponding to the each of the plurality of road indexes, each of the one or more GIS waypoints represented as indices within the each of the plurality of road indexes;
determine, from GPS information, a proximity of the apparatus to a first GIS waypoint of the one or more GIS waypoints of the road index relative to a second GIS waypoint of the one or more GIS waypoints of the road index;
generate index information as a compressed representation of the GPS Information representative of the proximity of the first apparatus to the first GIS waypoint relative to the second GIS waypoint, the index information comprising the road index corresponding to the road of the first apparatus and one or more values for the indices of the first GIS waypoint and the second GIS waypoint within the road index; and
transmit the index information to another apparatus.

8. The apparatus of claim 7, wherein the index information comprises a first value that is set based on the proximity of the apparatus to the first GIS waypoint compared to the second GIS waypoint, and, for the apparatus being in proximity to an intersection, a second value indicative of another proximity of the apparatus to a pathway of a plurality of pathways of the intersection.

9. The apparatus of claim 7, wherein the processor is configured to, for the proximity of the apparatus to the first GIS waypoint compared to the second GIS waypoint not being determinable, transmit the GPS information to the another apparatus.

10. The apparatus of claim 9, wherein the processor is further configured to transmit compression information indicative of uncompressed data when the processor transmits the GPS information, and indicative of compressed data when the first processor transmits the index information.

11. The apparatus of claim 7, wherein the processor is configured to obtain the GPS information based on a GPS sampling rate received from the another apparatus, wherein the GPS sampling rate determines a distance between the first GIS waypoint from the second GIS waypoint.

12. The system of claim 1, wherein the first apparatus is incorporated into a vehicle, wherein the second apparatus is a cloud server configured to track a location of the first apparatus based on the transmitted index information.

13. The system of claim 1, wherein the index information comprises an indication as to a type of location being one of a road and an intersection.

* * * * *